No. 741,675. PATENTED OCT. 20, 1903.
W. K-L. DICKSON.
ACCUMULATOR.
APPLICATION FILED MAY 16, 1901.
NO MODEL.
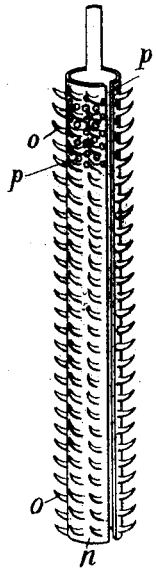
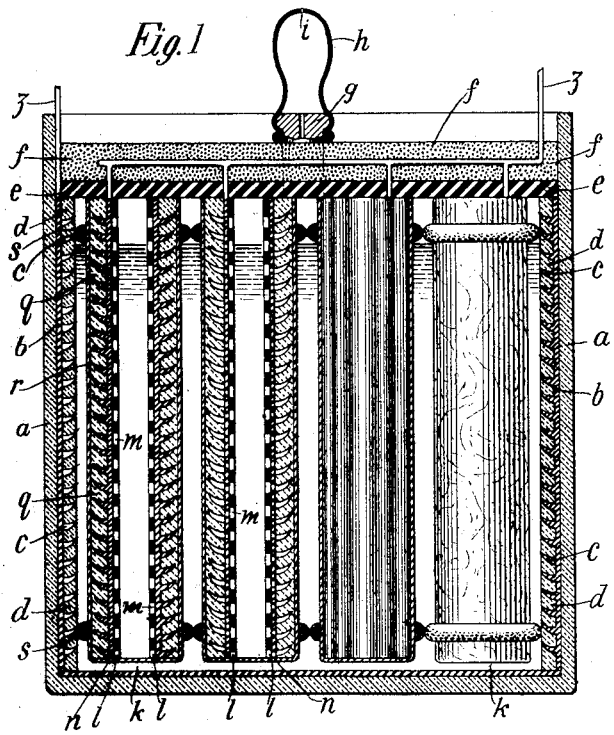
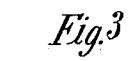
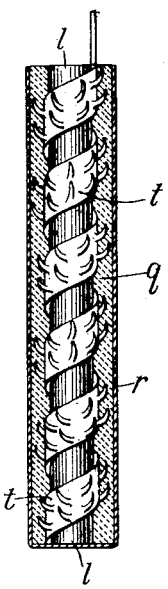
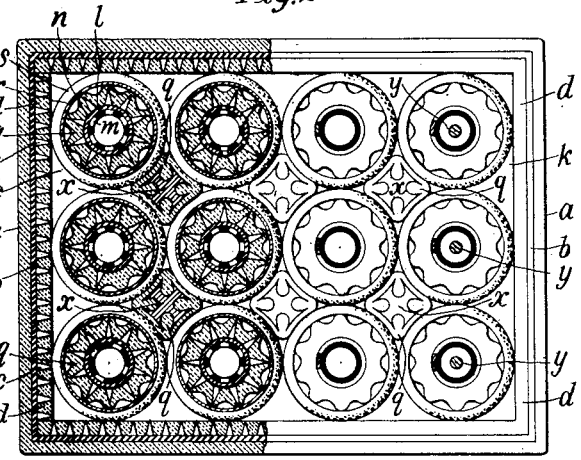
Witnesses:
Raphaël Netter
Peter A. Ross
William K-L. Dickson, Inventor
by Edmond Congar Brown, Att'y
THE NORRIS PETERS CO., PHOTO-LITHO., WASHINGTON, D. C.

No. 741,675. Patented October 20, 1903.

UNITED STATES PATENT OFFICE.

WILLIAM KENNEDY-LAURIE DICKSON, OF LONDON, ENGLAND.

ACCUMULATOR.

SPECIFICATION forming part of Letters Patent No. 741,675, dated October 20, 1903.

Application filed May 16, 1901. Serial No. 60,434. (No model.)

*To all whom it may concern:*

Be it known that I, WILLIAM KENNEDY-LAURIE DICKSON, a subject of the King of Great Britain and Ireland, and a resident of London, England, have invented certain new and useful Improvements in Accumulators, of which the following is a specification.

My invention relates to cells for the generation of electricity, and more especially to that type of such cells known as "accumulators" or "secondary" or "storage" cells or batteries.

The object of my invention is to provide a cell which shall be lighter, more efficient, and more durable than those now in use, and this object I attain by the novel construction, combination, and arrangement of the electrodes, the containing vessel, and the means for collecting the current all as hereinafter and in the accompanying drawings more particularly set forth.

In the said drawings, Figure 1 is a vertical section of a cell constructed according to my invention, two of the electrodes being shown in section and two entire. Fig. 2 is a top view, partly in section. Fig. 3 is a sectional view of one form of the electrodes. Fig. 4 is a view of one form of current-collecting means; Fig. 5, a sectional view of another form of electrode, and Fig. 6 a horizontal sectional view of one of the electrodes.

In this specification the terms "positive" and "negative" are always used with reference to the relation of the plates or electrodes toward each other while yielding an output of current.

In carrying my invention into effect I employ a containing vessel $a$, which may be constructed of hard rubber, glass, or any suitable material. The sides of this vessel are covered internally with a metallic conducting-lining $b$, having projecting from its surface thorn-shaped spines $c$. To this lining $b$ is applied and firmly pressed a layer of active material $d$, in the form of paste or otherwise, as may be preferable, the thickness of the said layer being about equal to the length of the spines $c$, which penetrate the said layer and make the attachment of the same more secure. The active material may be any suitable substance, such as litharge, which is adapted to be formed and to constitute, with the lining $b$ and spines $c$, a part of the positive surface of the cell.

Instead of being constructed as described the lining $b$ may be composed of lead, not porcupined and not provided with active material applied thereto, but adapted to become platenized and to itself become active.

The vessel $a$ is provided with a lid or cover $e$, of hard rubber or other suitable material, and over this may be placed, if desired, a layer of sealing material $f$. The cover $e$ and sealing-layer $f$ must of course be perforated to allow the passage of conducting-wires from the electrodes contained in the cell, as hereinafter described, and must also contain, preferably at one side adjacent to one of the walls of the cell, a perforation to permit the escape of gas from the interior of the cell, which perforation leads up to a perforated button $g$, (shown partly in section in Fig. 1,) over which is slipped a soft-rubber nipple $h$, having a small slit $i$ at the top, which remains normally closed, but which may open to allow the escape of gas.

In the vessel or cell $a$ are contained negative electrodes $k$, as well as positive electrodes, hereinafter to be described. These negative electrodes I prefer to construct in the following manner: A tube or core $l$, of hard rubber or other suitable material, having a number of perforations $m$, is surrounded with a hardened lead or other metallic sleeve or tube $n$, (see Fig. 4,) having spines $o$, similar to the spines $c$, and perforations $p$, similar to the perforations $m$ of the core $l$. Around this porcupined sleeve and its tubular core is placed a layer $q$ of paste or other form of material adapted to be formed into negative active material, such as red oxid of lead. After this layer $q$ has been applied the whole electrode is subjected to great pressure in a mold, which securely fixes the layer $q$ to the surface of the sleeve $n$, the attachment being made more secure by the spines $o$, which penetrate into the said layer. The mold in which the electrodes are compressed is preferably of such shape as to flute or corrugate the surface of the active material, so as to increase the surface of the same. The whole electrode may be incased in a sack $r$, of asbestos or other suitable material, and each electrode may be provided, if desired, with rubber insulating-rings $s$ outside of the said sack as a further precaution against short-circuiting.

Instead of hard rubber the core $l$ may be made of bamboo or similar material, which may be paraffined. An electrode having a bamboo core is shown in Fig. 3, having a metallic strip $t$, helically wound around the core $l$, provided with projecting points or spines, and active material $q$ applied and the whole covered with a sack $r$, as already described. Still another form is shown in Fig. 5, where a wire $u$ is shown wound helically around a bamboo core $l$ and also passing through the hollow interior of the core. It will of course be understood that the sleeve $n$, the helical strip $t$, and the wire $u$ are conducting or current-collecting devices and that the spines upon said sleeve and strip are intended not only to assist in holding the layer of active material firmly, but also to collect current therefrom and convey it to the sleeve or strip, as the case may be, of which they form an integral part. It will be also understood that the object of the perforations $m$ and $p$ is to permit a more free and complete access of the fluid of the cell to the interior portion of the layer of active material than would otherwise be the case. The bamboo cores are shown without such perforations, as the bamboo itself is more or less pervious to the fluid; but they can of course be perforated, if desired. There is no reason why the helical strip or wire should be used only with bamboo cores and the sleeve with rubber cores, as above described, since either or any analogous current-collecting device may be used with either or any suitable core or with no supporting-core whatever.

One form of positive electrode is shown in Fig. 2, the two electrodes on the left being in section and the other four being represented by a top view. A solid metallic core $x$, in cross-section resembling a Maltese cross, is surrounded by a layer of active material $q$, which is compressed into the shape shown, having four slightly-concave sides, so as to fit into the spaces between the negative electrodes. The positive electrodes may be provided with asbestos sacks, if desired, and also with insulation-rings, though the rings around the negative electrodes will usually be sufficient to keep the electrodes apart. The peculiar shape of the positive cores $x$ above described serves to hold the active material firmly, the projections from the core performing the same function as the spines with which certain forms of electrode heretofore described are provided.

Another form of positive electrode is represented in horizontal section in Fig. 6. It is here shown with a tubular core $l$, which may be of bamboo or other suitable material and may or may not be perforated, as desired, a metallic sleeve $n$, provided with projecting points or spines, and a layer of active material $q$. It will be understood that the same modifications and variations of form and structure are permissible in the case of these positive electrodes as have been described with regard to the negative electrodes and that any of the same may, if desired, be enveloped with asbestos sacks and fitted with insulating-rings.

In addition to the positive electrodes above described there may be used, if desired, other positive electrodes $y$ of comparatively small diameter placed inside of the tubular cores of the negative electrodes, as shown in the right-hand row of Fig. 2. These small positive electrodes $y$ may be of any of the various forms above described. They must of course be carefully insulated from the tubular cores inside of which they are placed. It must also be remembered that the lining of the vessel or cell forms a part of the positive-electrode system.

The various units of the negative and positive electrode systems respectively are connected by conductors which lead outward and form the terminals of the cell. These are indicated in Fig. 1 by $z\ z$.

In constructing my electrodes of either sign I prefer to incorporate in the paste or substance forming the layer of active material before the same is applied or compressed threads or fibers of asbestos for the purpose of binding the same together and also for the purpose of making the same porous and facilitating the access of the fluid of the cell to the interior of the active material. I may also employ in the same way and for the purpose of increasing the porosity of the active layer granulated pumice-stone or any similar or analogous material.

It will of course be understood that while the larger and more nearly cylindrical electrodes have been described as negative and the smaller electrodes and the cell-lining as positive there is no essential reason for such use of particular forms for either sign; but the polarity of the electrodes may, if desired, be the reverse of that herein specified, the paste applied to the same and intended to become active material being appropriately selected.

In some cases it may be desirable to dispense with the rubber or bamboo cores, and this of course can be done. Hardened-lead or bismuth-lead tubes can be used for cores, if desired.

The advantages of my invention over the previously-known art are, I believe, obvious to those familiar with the art. Some of the principal advantages will, however, be set forth. The configuration of the electrodes contained in the cell and their adaptation to each other, as well as the use of the cell-lining, afford a maximum of active surface for a minimum of weight. The use of light and perforated tubular cores combines strength with lightness. The compression of the active material over surfaces provided with projecting points or spines affords good electrical contact and secure mechanical attachment.

The nearly-cylindrical form of the electrodes avoids large flat surfaces and affords no opportunity for buckling or scaling off of active material, the same, on the contrary, shrinking in and making continually better electrical contact, the active material being also restrained by the asbestos envelop or sack. The use of asbestos fibers as a binder for the active layer increases both cohesion and porosity, and various other advantages of more or less importance may be pointed out, some of which have been indicated in the description of the various parts of the invention.

Having thus described my invention, what I claim as new, and desire to secure by Letters Patent, is as follows:

1. An electrode for accumulators, comprising a core; a conductor around the core having a surface provided with projecting points or spines; and a layer of active material in electrical and mechanical connection with said conducting-surface, substantially as herein set forth.

2. An electrode for accumulators, comprising a tubular core, the walls of which are transversely perforated; a conductor around the core having a surface provided with projecting points or spines; and a layer of active material in electrical and mechanical connection with said conducting-surface, substantially as herein set forth.

3. An electrode for accumulators, comprising a tubular core the walls of which are transversely perforated; a conductor around the core having transverse perforations and a surface provided with projecting points or spines; and a layer of active material in electrical and mechanical connection with said conducting-surface, substantially as herein set forth.

4. An electrode for accumulators, comprising a core, a helical conductor around the core having a surface provided with projecting points or spines, and a layer of active material in electrical and mechanical connection with said conductor, substantially as herein set forth.

5. An electrode for accumulators, comprising a tubular core having its walls transversely perforated; a helical conductor around the core having a surface provided with projecting points or spines; and a layer of active material in electrical and mechanical connection with said conductor, substantially as herein set forth.

6. In an accumulator, the combination with an electrode comprising a tubular conductive core having its walls transversely perforated, and a layer of active material, of an electrode of opposite sign placed within the tubular core of the first-named electrode, and means for electrically connecting the electrodes, substantially as herein set forth.

7. An electrode for accumulators, comprising a conductive core provided with retaining-grooves having undercut sides, and a layer of active material surrounding the same, said electrode being adapted to be placed in the interstice between adjacent cylindrical electrodes and having its sides concave to correspond to the convex surfaces of such surrounding electrodes, substantially as herein set forth.

8. In an accumulator, the combination with a containing vessel, provided with a lining provided with projecting points or spines bearing a layer of active material, said lining and active material being adapted to constitute an electrode of the cell; of electrodes of opposite sign within the cell each comprising a tubular core having its walls transversely perforated and bearing a layer of active material; and electrodes of similar sign to the said lining located within the said tubular cores, substantially as herein set forth.

9. In an accumulator, the combination with a containing vessel provided with a lining provided with projecting points or spines bearing a layer of active material, said lining and active material being adapted to constitute an electrode of the cell; of electrodes of opposite sign within the cell each comprising a tubular core having its walls transversely perforated, a conducting-sleeve also transversely perforated, and a layer of active material; and electrodes of similar sign to the said lining located within the said tubular core; substantially as herein set forth.

10. In an accumulator, the combination with electrodes in shape approximately cylinders; of isolated electrodes in shape approximately parallelepipedons but with concave side surfaces, adapted to be placed in the interstices between the cylindrical electrodes; substantially as herein set forth.

Signed at London, England, this 7th day of May, 1901.

WILLIAM KENNEDY-LAURIE DICKSON

Witnesses:
H. D. JAMESON,
A. NUTTING.